United States Patent
Mathiske

(10) Patent No.: US 7,231,523 B1
(45) Date of Patent: Jun. 12, 2007

(54) METHOD AND APPARATUS FOR FACILITATING SECURE EXTENSION OF AN APPLICATION

(75) Inventor: Bernd J. W. Mathiske, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 785 days.

(21) Appl. No.: 10/655,070

(22) Filed: Sep. 2, 2003

(51) Int. Cl.
*H04L 9/00* (2006.01)

(52) U.S. Cl. .................... 713/176; 713/181; 726/27

(58) Field of Classification Search ................ 713/161, 713/165, 167–168, 176, 181; 726/27, 30; 705/59
See application file for complete search history.

(56) References Cited

U.S. PATENT DOCUMENTS 6,079,018 A * 6/2000 Hardy et al. ................ 713/170
7,047,241 B1 * 5/2006 Erickson ........................ 707/9
7,146,609 B2 * 12/2006 Thurston et al. ............ 717/169

* cited by examiner

*Primary Examiner*—Hosuk Song
(74) *Attorney, Agent, or Firm*—Park, Vaughan & Fleming, LLP

(57) ABSTRACT

One embodiment of the present invention provides a method for facilitating secure extension of an application. The method operates by first establishing an agreement between an owner of the application and a third party to allow the third party to incorporate an extension into the application. Once an agreement has been established, the system causes the extension to be digitally signed with a private key associated with the owner of the application, whereby the resulting digital signature can be verified with a corresponding public key to confirm that the extension is authorized to be used by the application. The system also configures the application to operate with extensions signed with the private key. In a variation on this embodiment, causing the extension to be digitally signed involves receiving the extension from the third party and signing the extension with the private key belonging to the owner of the application.

22 Claims, 2 Drawing Sheets

METHOD AND APPARATUS FOR FACILITATING SECURE EXTENSION OF AN APPLICATION

BACKGROUND

1. Field of the Invention

The present invention relates to the design of operating systems for computer systems. More specifically, the present invention relates to a method and an apparatus for facilitating secure extension of an application within a computer system.

2. Related Art

In recent years, microprocessors have become increasingly powerful, while requiring less physical space and power. This trend has allowed microprocessors to be used in numerous devices in addition to traditional computer systems. Mobile devices, such as PDAs, cell phones, cameras, and audio devices have all benefited from this trend. Due to the increased capability of these embedded microprocessors, mobile devices are now offering increased functionality and upgradeability that has not been possible in the past. However, at the same time, companies are facing new challenges arising from this rapid increase in functionality.

Hardware manufacturers must decide whether to open up their devices to allow them to be extended by third parties, or to close them off in order to control extensions to their product. If a company chooses to open a device to third parties, these third parties might write code that impairs the functionality of the device, thus resulting in a negative experience for the consumer. In many cases, the consumer will associate this negative experience with the device itself, or with the company that manufactured the device, and not with the third party. Additionally, malicious programmers can take advantage of the open architecture to spread viruses or to cause any number of unwanted problems.

On the other hand, if a company closes off their devices to third party developers, they severely limit choices available to consumers who use the devices, and thus risk losing market share to competitors.

Hence, what is needed is a way to extend the functionality of a computing device without the inherent problems listed above.

SUMMARY

One embodiment of the present invention provides a method for facilitating secure extension of an application. The method operates by first establishing an agreement between an owner of the application and a third party to allow the third party to incorporate an extension into the application. Once an agreement has been established, the system causes the extension to be digitally signed with a private key associated with the owner of the application, whereby the resulting digital signature can be verified with a corresponding public key to confirm that the extension is authorized to be used by the application. The system also configures the application to operate with extensions signed with the private key.

In a variation on this embodiment, causing the extension to be digitally signed involves receiving the extension from the third party and signing the extension with the private key belonging to the owner of the application.

In a further variation, signing the extension involves creating a message digest of the extension and signing the message digest with the private key belonging to the owner of the application.

In a variation on this embodiment, causing the extension to be digitally signed involves issuing a private key to the third party, and then allowing the third party to sign the extension with the private key.

In a variation on this embodiment, configuring the application to operate with signed extensions involves configuring the application to verify that the extension includes a chain of certificates establishing authorization for the extension, wherein a certificate in the chain is signed by an entity that is originally empowered to authorize the extension, and subsequent certificates in the chain are signed by entities that have been delegated power to authorize the extension.

In a variation on this embodiment, the application is an operating system.

In a variation on this embodiment, the application is a platform-independent virtual machine, such as a Java Virtual Machine™.

In a variation on this embodiment, configuring the application to operate with extensions signed with the private key further involves storing a public key associated with the owner of the application in an area accessible to the application. The system also incorporates instructions for verifying the authenticity of the extension into the application.

In a further variation, the area accessible to the application is located in read-only memory.

In a variation on this embodiment, the agreement involves payment of a licensing fee from the third party to the owner of the application.

In a variation on this embodiment, the application runs on a memory-constrained computing device.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 1:
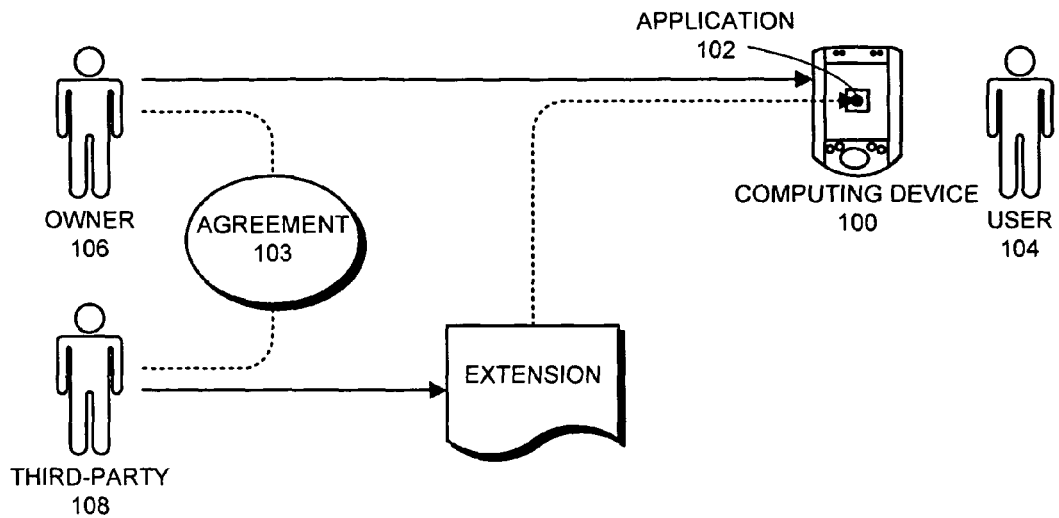
FIG. 1 illustrates a computing device in accordance with an embodiment of the present invention.

FIG. 1 illustrates computing device 100 in accordance with an embodiment of the present invention. Computing device 100 can generally include any type of computer system, including, but not limited to, a computer system based on a microprocessor, a mainframe computer, a digital signal processor, a portable computing device, a personal organizer, a device controller, and a computational engine within an appliance.

Computing device 100 includes application 102. Application 102 can include, but is not limited to, an operating system and a platform-independent virtual machine. In one embodiment of the present invention, application 102 is a JVM. (The terms JAVA, JVM and JAVA VIRTUAL MACHINE are trademarks of SUN Microsystems, Inc. of Santa Clara, Calif.)

The system presented in FIG. 1 also includes agreement 103, user 104, owner 106, and third-party 108. Owner 106 represents a company that owns the rights to sell computing device 100. In the present embodiment, owner 106 reaches an agreement 103 with third-party 108 to allow third-party 108 to create extensions to application 102. Owner 106 subsequently causes software extensions created by third-party 108 to be digitally signed with a private key, and also configures the application to only operate with such digitally signed extensions. In this manner, user 104 is only allowed to use extensions to application 102 that have been agreed upon by owner 106.

Secure Software Extension

Figure 2:
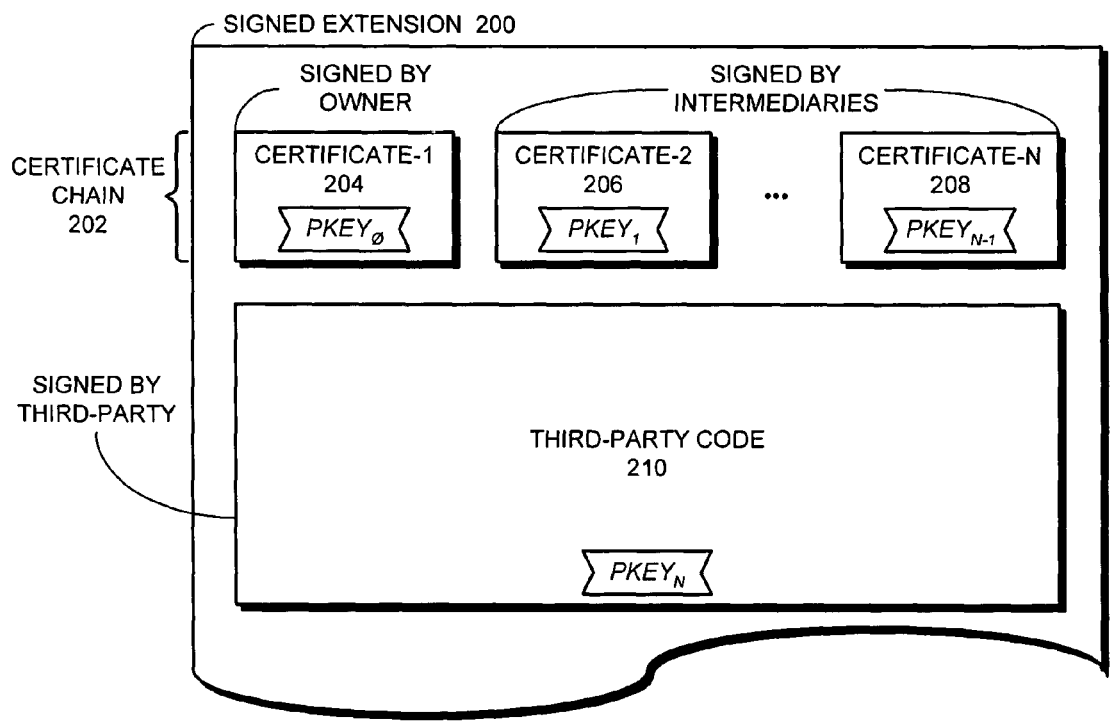
FIG. 2 illustrates a software extension for an application in accordance with an embodiment of the present invention.

FIG. 2 illustrates signed extension 200 in accordance with an embodiment of the present invention. Signed extension 200 includes certificate chain 202 and third-party code 210. Certificate chain 202 includes a chain of certificates that establishes a chain of authorization for the service. One certificate in the chain is signed by an entity that is originally authorized to confer access for the service, and subsequent certificates in the chain are signed by entities that have been delegated authorization to confer access for the service from preceding entities in the chain.

For purposes of this detailed disclosure, a certificate is a signed electronic document that certifies that something is true. A certificate typically indicates that someone has ownership of a public key. In the present invention, a certificate can indicate that an entity can have access to services represented by a key. A certificate may include the identity of a signing authority as well as a digital signature produced with a private key (which can be validated with a corresponding public key). For example, one certificate format is defined under the X.509 standard.

For purposes of this detailed disclosure, a digital signature is a value derived from a file using a secret such that it can be demonstrated that the value was derived using the secret, wherein the secret is known only to the signer. A digital signature may take the form of a message digest produced by the key and appended to the file, or may take the form of a transformation of data within the file using the key. A digital signature may also take the form of a message digest encrypted by the private key of a public key private key cryptography system.

For example, in the illustrated embodiment, certificate chain 202 includes certificate-1 204, certificate-2 206 and certificate-N 208. Owner 106 can initially start with a private key zero. In order to pass along authority for a role, owner 106 generates a certificate-1 204 and an associated public key private key pair, the private key being private key one. Owner 106 signs certificate-1 204 with private key zero and passes certificate-1 204 along with the corresponding private key one to a first intermediary. The first intermediary generates certificate-2 206 along with a corresponding public key private key pair, including private key two. The first intermediary signs certificate-2 206 with private key one and passes certificate-2 206, along with the associated private key two and all previous certificates in the chain, to a following intermediary. This pattern continues up the chain until a final intermediary signs certificate-N 208 with private key N−1 and passes the certificate-N 208, along with corresponding private key N and all previous certificates in the chain, to third-party 108. Third-party 108 uses private key N to sign third-party code 210, and then generates secure extension 200, which includes certificate chain 202 and third-party code 210.

Figure 3:
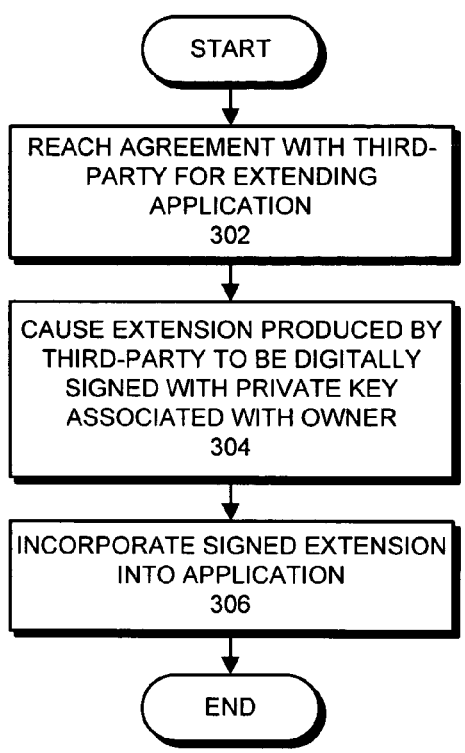
FIG. 3 presents a flowchart illustrating the process of creating a secure extension for an application in accordance with an embodiment of the present invention.

Hence, secure extension 200 includes a verifiable chain of certificates 202 signed by intermediaries from owner 106 to third-party 108. Certificate chain 202 can be verified by using the public keys to verify that certificates in the chain are properly signed with their corresponding private keys Creating a Secure Software Extension FIG. 3 presents a flowchart illustrating the process of creating a secure extension for an application in accordance with an embodiment of the present invention. The system starts when owner 106 reaches an agreement with third-party 108 to allow third-party 108 to create extensions to application 102 (step 302). Owner 106 then causes an extension produced by third-party 108 to be digitally signed with a private key associated with owner 106 (step 304). Note that owner 106 can digitally sign signed extension 200 with a private key, or can allow third-party 108 to digitally sign signed extension 200 with a private key that has been issued to third-party 108 in the manner described by FIG. 2. Finally, owner 106 incorporates the signed extension 200 into application 102 (step 306). Note that user 104 may also incorporate secure extension 200 directly into application 102.

In one embodiment of the present invention, owner 106 has an agreement that does not allow owner 106 to create a public native interface to application 102. By requiring third parties to contact owner 106 to establish an agreement to be able to extend application 102, owner 106 can create a private native interface to application 102, and thus avoid violating the agreement not to create a public interface for application 102.

Integrating a Secure Software Extension

Figure 4:
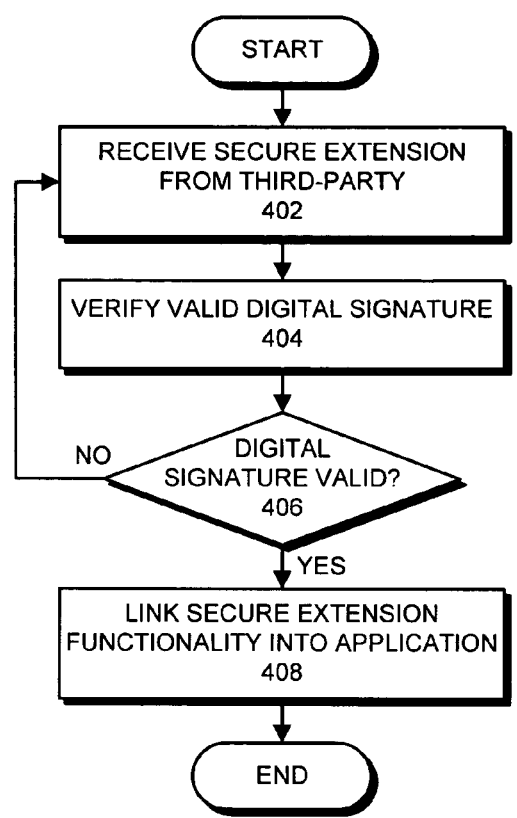
FIG. 4 presents a flowchart illustrating the process of integrating a secure extension into an application in accordance with an embodiment of the present invention.

FIG. 4 presents a flowchart illustrating the process of integrating secure extension 200 into application 102 in accordance with an embodiment of the present invention. The system starts when secure extension 200 is received from third-party 108 at computing device 100 (step 402). Upon receiving secure extension 200, application 102 checks to see if secure extension has a valid digital signature and if the digital signature originated with an authorized source (step 404). This step can be accomplished using the Public Key Infrastructure (PKI) techniques described earlier. If the digital signature is determined to be invalid (step 406), the system discards the extension and returns to step 402. However, if the digital signature is determined to be valid and that it originated from an authorized source, the system links secure extension 200 into application 102 (step 408). Note that the mechanism for checking the validity of the secure extension, and the keys required to do so, can be stored in ROM on computing device 100 in order to minimize the chances of malicious activity.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating secure extension of an application, comprising:
   establishing an agreement between an owner of the application and a third party to allow the third party to incorporate an extension into the application;
   causing the extension to be digitally signed with a private key associated with the owner of the application, whereby the resulting digital signature can be verified with a corresponding public key to confirm that the extension is authorized to be used with the application; and
   configuring the application to operate with extensions signed with the private key, wherein configuring the application involves:
      storing a public key associated with the owner of the application in an area accessible to the application, and
      incorporating instructions for verifying the authenticity of the extension into the application.

2. The method of claim 1, wherein causing the extension to be digitally signed involves:
   receiving the extension from the third party; and
   signing the extension with the private key belonging to the owner of the application.

3. The method of claim 2, wherein signing the extension involves:
   creating a message digest of the extension; and
   signing the message digest with the private key belonging to the owner of the application.

4. The method of claim 1, wherein causing the extension to be digitally signed involves:
   issuing a private key to the third party; and
   allowing the third party to sign the extension with the private key.

5. The method of claim 1, wherein configuring the application to operate with signed extensions involves configuring the application to verify that the extension includes a chain of certificates establishing authorization for the extension, wherein a certificate in the chain is signed by an entity that is originally empowered to authorize the extension, and subsequent certificates in the chain are signed by entities that have been delegated power to authorize the extension.

6. The method of claim 1, wherein the application is an operating system.

7. The method of claim 1, wherein the application is a platform-independent virtual machine.

8. The method of claim 7, wherein the platform-independent virtual machine is a Java Virtual Machine.

9. The method of claim 1, wherein the area accessible to the application is located in read-only memory.

10. The method of claim 1, wherein the agreement involves payment from the third party to the owner of the application in the form of a licensing fee.

11. The method of claim 1, wherein the application runs on a memory-constrained computing device.

12. A means for facilitating secure extension of an application, comprising:
   an establishment means for establishing an agreement between an owner of the application and a third party to allow the third party to incorporate an extension into the application;
   a signing means for causing the extension to be digitally signed with a private key associated with the owner of the application, whereby the resulting digital signature can be verified with a corresponding public key to confirm that the extension is authorized to be used with the application; and
   a configuration means for configuring the application to operate with extensions signed with the private key, wherein the configuration means comprises:
      a storing means for storing a public key associated with the owner of the application in an area accessible to the application; and
      an incorporation means for incorporating instructions for verifying the authenticity of the extension into the application.

13. The means of claim 12, wherein causing the extension to be digitally signed involves:
   a receiving means for receiving the extension from the third party; and
   a second signing means for signing the extension with the private key belonging to the owner of the application.

14. The means of claim 13, wherein signing the extension involves:
   a digesting means for creating a message digest of the extension; and
   a third signing means for signing the message digest with the private key belonging to the owner of the application.

15. The means of claim 12, wherein causing the extension to be digitally signed involves:
   an issuing means for issuing a private key to the third party; and
   a second signing means allowing the third party to sign the extension with the private key.

16. The means of claim 12, wherein configuring the application to operate with signed extensions further comprises a second configuration means for configuring the application to verify that the extension includes a chain of certificates establishing authorization for the extension, wherein a certificate in the chain is signed by an entity that is originally empowered to authorize the extension, and subsequent certificates in the chain are signed by entities that have been delegated power to authorize the extension.

17. The means of claim 12, wherein the application is an operating system.

18. The means of claim 12, wherein the application is a platform-independent virtual machine.

19. The means of claim 18, wherein the platform-independent virtual machine is a Java Virtual Machine.

20. The means of claim 12, wherein the area accessible to the application is located in read-only memory.

21. The means of claim 12, wherein the agreement involves payment from the third party to the owner of the application in the form of a licensing fee.

22. The means of claim 12, wherein the application runs on a memory-constrained computing device.

* * * * *